US 6,606,631 B1

(12) United States Patent
Martin, Jr. et al.

(10) Patent No.: US 6,606,631 B1
(45) Date of Patent: Aug. 12, 2003

(54) IMS ON-LINE REORGANIZATION UTILITY (75) Inventors: James L. Martin, Jr., Round Rock, TX (US); George Norman Crown, Jr., Sugar Land, TX (US)

(73) Assignee: BMC Software, Inc., Houston, TX (US)

( * ) Notice: Subject to any disclaimer, the term of this patent is extended or adjusted under 35 U.S.C. 154(b) by 303 days.

(21) Appl. No.: 09/615,569

(22) Filed: Jul. 13, 2000

(51) Int. Cl.$^7$ .............................................. G06F 17/30
(52) U.S. Cl. ..................... 707/101; 707/200; 707/100; 707/8; 711/129; 711/173
(58) Field of Search ................................ 707/102, 103, 707/100, 101, 201, 202, 200, 8; 712/222; 714/1; 711/129, 173

(56) References Cited

U.S. PATENT DOCUMENTS

| | | | |
|---|---|---|---|
| 5,435,004 A | * 7/1995 | Cox et al. ..................... 707/205 |
| 5,721,915 A | * 2/1998 | Sockut et al. ................ 707/200 |
| 5,761,667 A | * 6/1998 | Koeppen ..................... 707/100 |
| 5,881,379 A | * 3/1999 | Beier et al. .................. 707/100 |
| 5,933,820 A | * 8/1999 | Beier et al. ...................... 707/1 |
| 5,991,761 A | * 11/1999 | Mahoney et al. ............ 707/100 |
| 6,026,412 A | * 2/2000 | Sockut et al. ................ 707/200 |
| 6,070,170 A | * 5/2000 | Friske et al. ................. 707/200 |
| 6,122,640 A | * 9/2000 | Pereira ........................ 707/100 |
| 6,144,970 A | * 11/2000 | Bonner et al. ............... 707/206 |
| 6,247,024 B1 | * 6/2001 | Kincaid ....................... 707/204 |
| 6,289,347 B1 | * 9/2001 | Giroux ......................... 707/10 |
| 6,418,443 B1 | * 7/2002 | Martin et al. ................ 707/101 |

* cited by examiner

Primary Examiner—Jean M. Corrielus
(74) Attorney, Agent, or Firm—Wong, Cabello, Lutsch, Rutherford, & Brucculeri, L.L.P.

(57) ABSTRACT

An improved method and system for on-line reorganization of an IMS database while allowing concurrent updates. In one embodiment, the method involves building and dynamically maintaining a map of free blocks in the IMS database. The user then provides a list of candidate database records to be analyzed. The physical characteristics of each database record on the list are then analyzed. Calculations are made to identify fragmented database records and the segments which contain fragmented boundary twin chains. A reorganization recommendation list is created for each database record on the list, including fragmented boundary twin chains. Each fragmented database record on the reorganization recommendation list is then reorganized. This reorganization process includes the following steps: a) determine the number of blocks needed; b) assign and protect the number of blocks needed; c) identify the assigned blocks; d) retrieve the database record, delete the database record, and insert the database record into the identified blocks; e) commit the changes to the database. This process of analyzing the physical characteristics of each database record on the list and reorganizing the database records is continued until each database record on the list is no longer fragmented. User access to the database is maintained (i.e., the database is on-line) during the analyzing and reorganizing processes.

36 Claims, 8 Drawing Sheets

IMS ON-LINE REORGANIZATION UTILITY

BACKGROUND OF THE INVENTION

1. Field of the Invention

The present invention relates to computer software, and more particularly to reorganizing databases.

2. Description of the Related Art

The IMS database (IMS DB) was created in 1970 by International Business Machines Corporation (IBM) and is one of the two major parts to IBM's IMS/ESA (Information Management System/Enterprise Systems Architecture). The second part is a data communications system (IMS Transaction Manager or IMS TM). Together, the transaction manager and the database manager create a complete online transaction processing environment providing continuous availability and data integrity. IMS/ESA runs under the MVS/ESA or OS/390 operating systems, which run on the S/390 platform.

At the heart of IMS DB are its databases and its data manipulation language, Data Language/I (DL/I). The IMS database is a hierarchical (non-relational) database. IMS databases are hierarchic collections of data, information organized in a pyramid fashion with data at each level of the hierarchy related to, and in some way dependent upon, data at the higher level of the hierarchy. DL/I calls allows a user to create and access these IMS databases.

An IMS database may include one or more data set groups. Each data set group may include one or more segments. A segment is the smallest piece of data DL/I can store. Each segment may be qualified by its hierarchical relationship to other segments in a database record. Each database record has one root segment and zero or more child segments. A "root segment" is at the top of the hierarchy, and there may be only one root segment in a database record. All other segments (other than the one root segment) in a database record are referred to as "dependent segments", and their existence depends on there being a root segment. A "parent segment" is any segment that is defined in the database descriptor (DBD) as capable of having a dependent segment beneath it in the hierarchy. A "child segment" is any segment that is a dependent of another segment above it in the hierarchy.

Segments may be of various segment types. Those segments which share similar qualities are of the same type. For example, if the root segment of a database record represents a course, and that root segment has three child segments labeled: instructor, student, and location, those child segments may be referred to as segment types.

The root segment is referred to as a first level of the IMS database, direct children of the root segment are referred to as a second level of the IMS database. As used herein, a second level of the IMS database may alternatively be referred to as a first level child segment, as child segments may only appear starting with the second level of the IMS database. Similarly, children of the children of the root segment (i.e., grandchildren of the root segment) are referred to as a third level of the IMS database, or alternatively, second level child segments. The level of each subsequent generation of children may be determined by incremented the previous level by One (e.g., a fourth level of the IMS database is equivalent to a third level child segment).

An IMS database includes ten data set groups into which segments of an IMS database may be written. Each segment type may only be assigned to one data set group. When IMS databases are created, definitions of which data set group each segment type is to be written to are specified. In some cases, an IMS database may also be divided into partitions, in addition to being distributed across data set groups. A database record is made up of a root segment and child segments. As an IMS database is used, segments and database records are added, modified and deleted. Over time, the child segments of a database record may become scattered across different blocks within a data set group, resulting in slower access times and longer latencies than would occur if the child segments were closer together. Reorganizing the location of the various segments of an IMS database such that segments of database records are closer together results in faster access times and shorter latencies.

Figure 3:
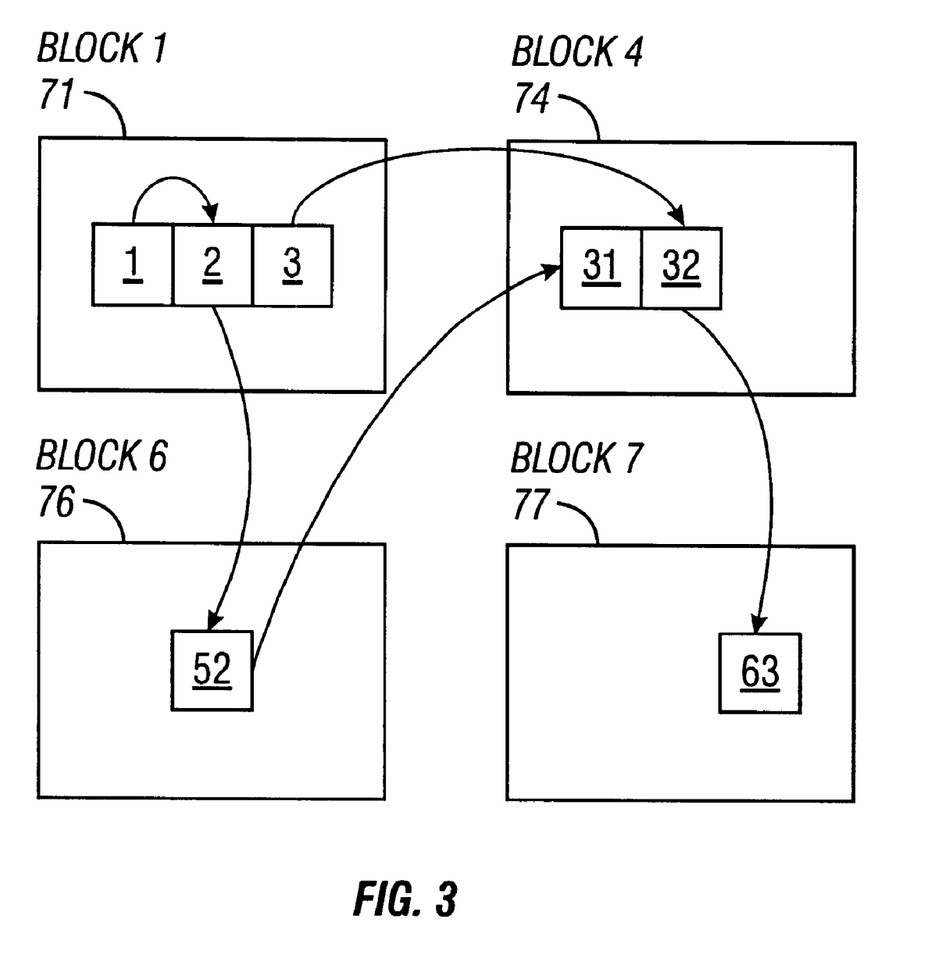
FIG. 3 illustrates two examples of fragmented database records in an IMS database.

The need to reorganize an IMS database stems from the dynamic nature of insertions and deletions of segments in an IMS database. In general, as new child segments are added to an IMS database hierarchy, the segments may be added to blocks depending on space availability. As a result, related segments (i.e., segments belonging to the same database record) may be stored in different blocks, possibly non-contiguous blocks. This results in a fragmented database, as shown in FIG. 3. As a result, access of a database record may require reading a number of non-contiguous blocks, which results in lengthier access times. One method of reducing access times is to reorganize the IMS database in order to more closely position segments belonging to the same database record.

The current technique of reorganizing an IMS database requires that the IMS database be off-line. After the database is brought back on-line, access times may be better than before the reorganization. However, during the reorganization users have no access to the database records.

Therefore, reorganizing an IMS database in order to speed up the access times and reduce the latencies is more desirable to the user if user access to the IMS database may be maintained during the reorganization (i.e., on-line reorganization). For at least the foregoing reasons, there is a need for an improved system and method for reorganizing databases, such as IMS databases, in a more efficient manner.

SUMMARY OF THE INVENTION

The present invention provides various embodiments of an improved method and system for on-line reorganization of an IMS database while allowing concurrent updates.

In one embodiment, the method involves building and dynamically maintaining a map of free blocks in the IMS database. The user then provides a list of candidate database records to be analyzed. This list may include a keyword (i.e., "ALL"), or may identify individual database records.

The physical characteristics of each database record on the list are then analyzed. Physical Locator (PL) trace records are built for each database record on the list. The PL trace records contain physical location information for each segment of each database record on the list. The PL trace records are used to calculate a total number of physical blocks currently used to hold each database record on the list and a minimum number of physical blocks needed to hold each database record on the list. These calculations are made in order to identify fragmented database records and the segments which contain fragmented boundary twin chains. A reorganization recommendation list is then created for each database record on the list, including fragmented boundary twin chains.

Each fragmented database record on the reorganization recommendation list is then reorganized. This reorganization process includes the following steps: a) determine the number of blocks needed; b) assign and protect the number of blocks needed; c) identify the assigned blocks; d) retrieve the database record, delete the database record, and insert the database record into the identified blocks; e) commit the changes to the database.

This process of analyzing the physical characteristics of each database record on the list and reorganizing the database records may be continued until each database record on the list is no longer fragmented. User access to the database is maintained (i.e., the database is on-line) during the analyzing and reorganizing processes.

Following the analysis of each database record individually, the IMS database as a whole may be analyzed to determine if the IMS database is disorganized from a database record to database record standpoints. If such a disorganization is found, then the IMS database is subsequently reorganized, database record by record.

BRIEF DESCRIPTION OF THE DRAWINGS

A better understanding of the present invention can be obtained when the following detailed description of various embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Incorporation by Reference

The following material is hereby incorporated by reference as though fully and completely set forth herein: U.S. application Ser. No. 09/496,241 titled "Hot Spot Analysis of IMS Databases" and filed Feb. 1, 2000, whose inventor is James L. Martin Jr.

Figure 1:
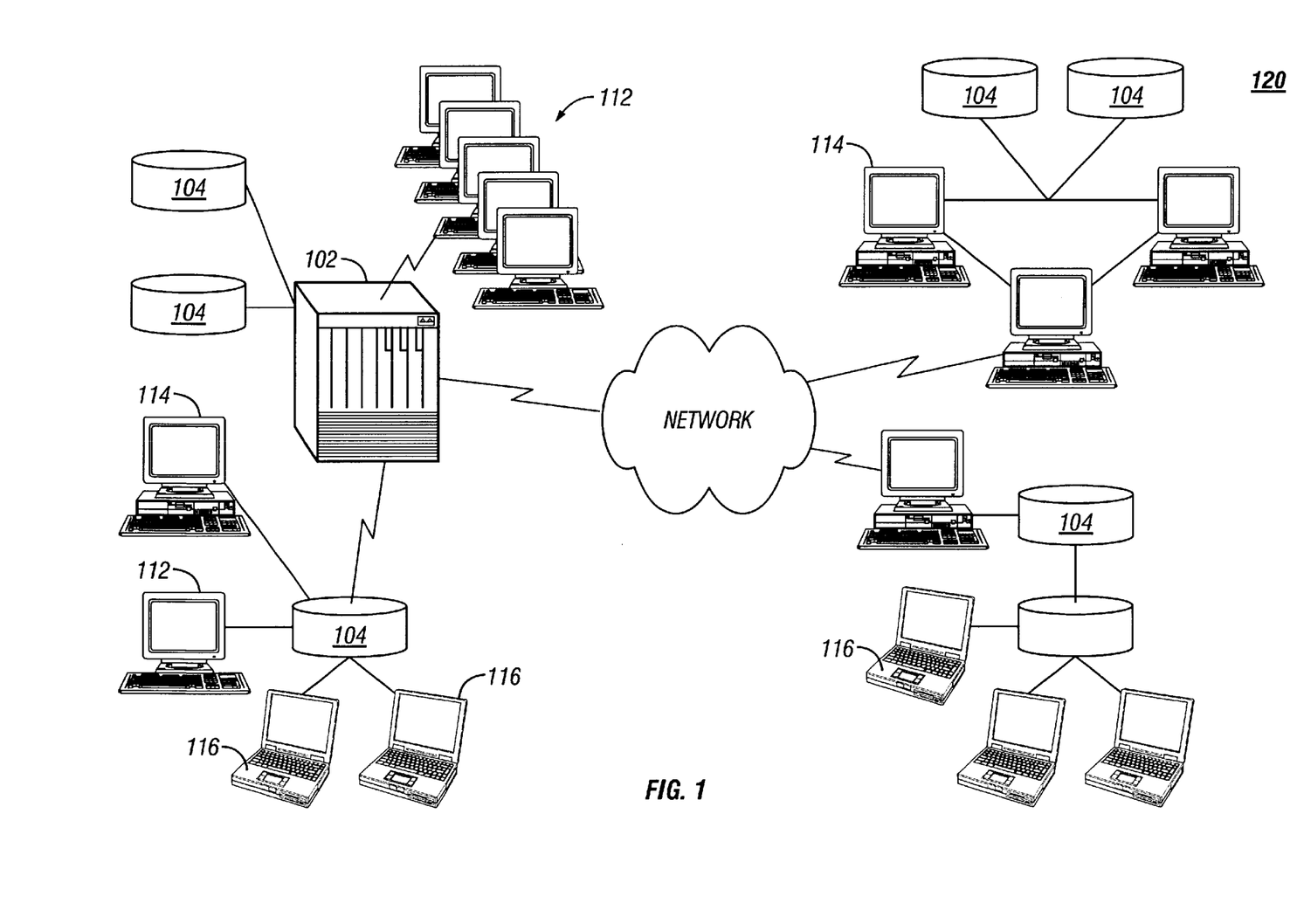
FIG. 1 illustrates an exemplary enterprise computing environment.

FIG. 1: An Enterprise Computing Environment

FIG. 1 illustrates an exemplary enterprise computing environment according to one embodiment of the present invention. As shown, the enterprise computing environment may include one or more computers 102, shown as mainframe computers 102, which each include one or more storage devices 104, also referred to as direct access storage devices (DASD). A plurality of computer systems or terminals 112 may be coupled to the mainframe computer 102, wherein the computer systems or terminals 112 access data stored in the storage devices 104 coupled to or comprised in the mainframe computer 102.

The mainframe computer system 102 may be coupled to one or more other computer systems and/or computer networks. The mainframe computer system 102 may be coupled locally to a computer system network 120 in a local area network (LAN) configuration, or may be coupled to one or more computer systems and/or networks through a wide area network (WAN). As shown in FIG. 1, the mainframe computer system 102 may be directly coupled to a local area network 120, such as a PC-based or client/server based network. The LAN 120 may comprise a storage device or file server 104 coupled to one or more desktop computer systems 114, one or more portable computer systems 116 and possibly one or more computer systems or terminals 112. As also shown in FIG. 1, the mainframe computer 102 may also be coupled through a wide area network, represented by the "cloud" in FIG. 1, to one or more additional local area networks, such as PC-based networks as shown. Each of the PC based networks may comprise one or more storage devices or file servers 104 and one or more of either desktop computer systems 114 or portable computer systems 116. The wide area network may be any of various types, such as the Internet.

Each of the one or more mainframe computer systems 102, the computer systems 114 and 116, as well as file servers 104 may include various components as is standard in computer systems. For example, the mainframe computer system 102 may include one or more processors or CPUs, preferably multiple CPUs, as well as non-volatile memory, such as represented by elements 104, and various internal buses etc. as is well known in the art. In a similar manner, each of the desktop computer systems 114 and/or portable computer systems 116, or other computer systems comprised in the enterprise, comprise various standard computer components including one or more CPUs, one or more buses, memory, a power supply and non-volatile memory. The computer systems or terminals 112 may comprise standard "dumb" terminals as used with mainframes, i.e., may comprise a display and video hardware and/or memory for displaying data on the display provided from the mainframe computer system 102.

The mainframe computer system 102 may store a database comprising data which is desired to be accessible among a portion or all of the enterprise, e.g., is desired to be accessible by one or more of the computer systems 114 and 116. In the present application, the term "database" includes both databases and data sets, such as an IMS data set, among others. In one embodiment, the database stored in the mainframe computer system 102 is desired to be distributed among one or more of the various file servers 104 connected to the various computer systems 114 and 116. Thus, it is desired that the data comprising the database be distributed among the enterprise for ready access among multiple users. It is also possible that multiple different database management systems are used within the enterprise, i.e., one or more of the file systems 104 may store its own database which is desired to be replicated among various of the other file servers and/or the mainframe computer system 102. In the preferred embodiment, the database stored on the mainframe computer system is the IMS database. However, the present invention may be used with other types of databases.

The present invention preferably comprises on-line reorganization utility software programs stored in the mainframe computer system 102 and/or one or more of the computer systems 114, 116 or 104 which operate to provide various services. Where the database used is the IMS database, the on-line reorganization utility software programs comprise IMS on-line reorganization utility software programs. The IMS on-line reorganization utility software programs are preferably comprised on the mainframe computer system 102. However, it is noted that portions of the IMS on-line reorganization utility software programs may be distributed throughout one or more computers in the enterprise. Also, the IMS on-line reorganization utility software programs preferably interface to one or more various OEM utilities.

One or more of the computer systems 102, 112, 114, and 116 preferably include a memory medium on which computer programs according to the invention may be stored. The term "memory medium" is intended to include an installation medium, e.g., a CD-ROM, or floppy disks, a computer system memory or random access memory such as DRAM, SRAM, EDO RAM, Rambus RAM, etc., or a non-volatile memory such as a magnetic media, e.g., a hard drive, "DASD", or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer systems 102/104, 112, 114, and 116 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software utility program or programs for on-line reorganization for IMS databases as described herein. The software program(s) may be implemented in any of various ways, including procedure-based techniques, component-based techniques, and/or object-oriented techniques, among others. For example, the software program may be implemented using ActiveX controls, C++ objects, Java objects, Microsoft Foundation Classes (MFC), or other technologies or methodologies, as desired. A computer system executing code and data from the memory medium comprises a means for creating and executing the software program or programs according to the methods and/or block diagrams described below.

Various embodiments further include receiving or storing instructions and/or data implemented in accordance with the foregoing description upon a carrier medium. Suitable carrier media include storage media or memory media such as magnetic or optical media, e.g., disk or CD-ROM, as well as signals such as electrical, electromagnetic, or digital signals, conveyed via a communication medium such as networks 102 and/or 104 and/or a wireless link.

In the preferred embodiment, the present invention comprises one or more software components, preferably a plurality of software components, which operate to provide various on-line reorganization utilities for databases, such as IMS databases.

The present invention further comprises a system and method to reorganize an IMS database while the IMS database is on-line. The system and method to reorganize an IMS database while the IMS database is on-line is designed for ease of use and high-performance, and features an extensible architecture. To enhance performance, the system and method of the present invention are designed to minimize I/O and CPU overhead, and limit maintenance downtime. Since the segments of the IMS database are reorganized while the IMS database is on-line, access to the IMS database by users is not limited. This method is significantly more efficient than off-line reorganization of the IMS database.

The system and method of the present invention also makes opportunistic use of database maintenance time. According to one embodiment of the present invention, a DBA (Data Base Administrator) is able to reorganize the IMS database without restricting user access, as the reorganization is done while the IMS database is on-line. DBAs are thus able to perform the reorganization at the same time that users are accessing the IMS database, for improved efficiency.

Figure 2:
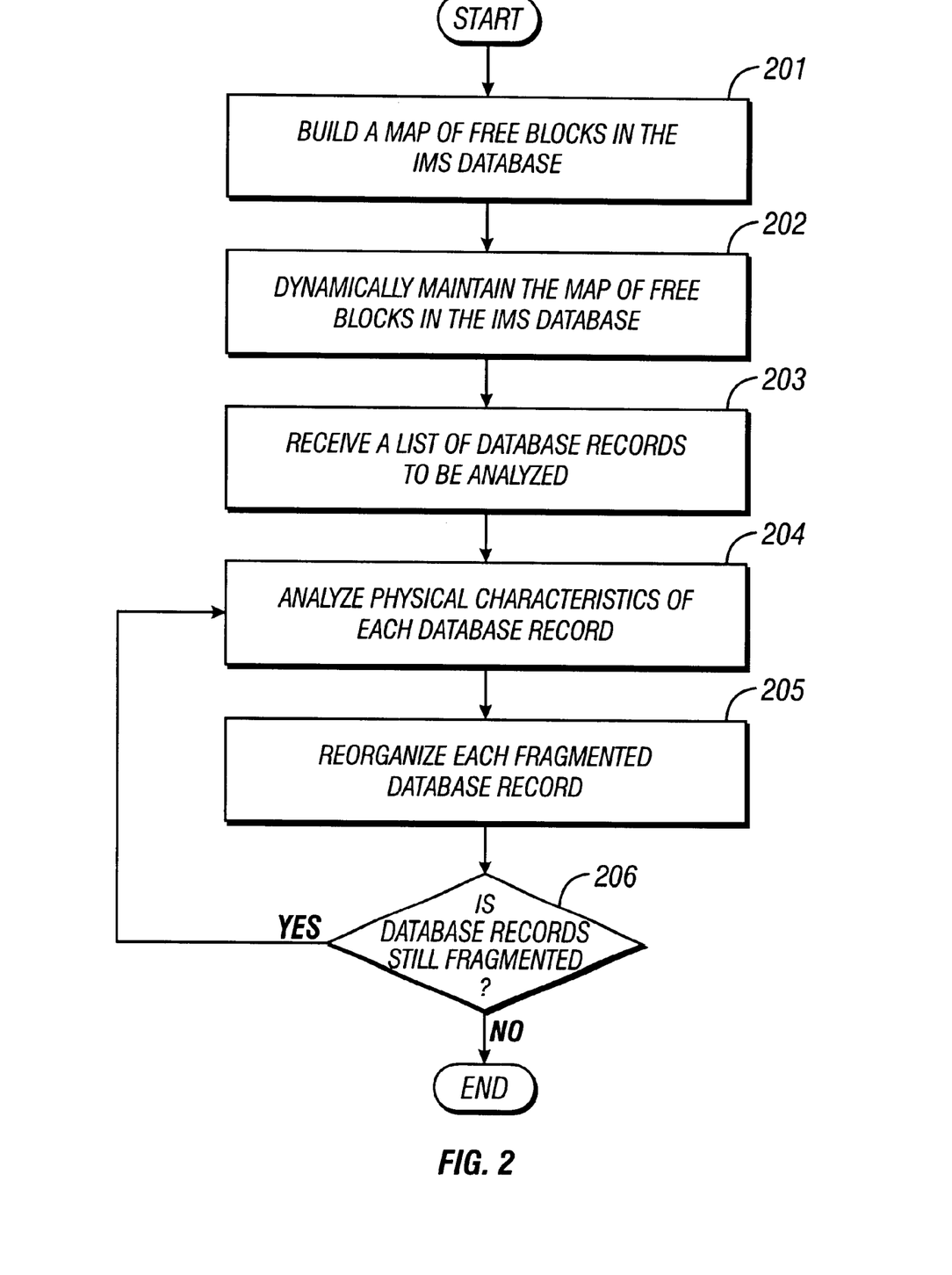
FIG. 2 is a flowchart illustrating an overview of on-line reorganization of an IMS database according to one embodiment.

FIG. 2: On-line Reorganization of an IMS Database

FIG. 2 is a flowchart of an embodiment of a system and method for on-line reorganization of an IMS database. There are three main components of the on-line reorganization method, namely: on-line reorganization (OLR), space manager (SM), and hot spot analysis (HSA).

In step 201 the OLR component initiates a call to the SM component to build maps of free blocks in the IMS database. The maps of free blocks include a "free space bit" for each block in the IMS database. In building the maps of free blocks in the IMS database, the SM component reads and analyzes each block of the IMS database and generates "free space bits" accordingly for each block. If the "free space bit" is turned "on" for a particular block, this means that the amount of free space for that particular block exceeds a pre-determined, user-specified threshold or default value. Accordingly, the block may be labeled as "free". Conversely, if the "free space bit" is turned "off" for a particular block, this means that the amount of free space for that particular block falls below a pre-determined, user-specified threshold or default value, and the block may be labeled as "used."

In step 202 the SM component may asynchronously monitor the amount of free space for each block in the IMS database, over time. As blocks change status (i.e., from free to used, or from used to free) over time as transactions are processed for the IMS database, the SM component changes the "free space bit" accordingly. For example, if a particular block is marked as "free" (i.e., the "free space bit" is turned "on") and due to insertions into the IMS database the block crosses the threshold for the amount of free space, then the SM component will turn "off" that "free space bit", to prevent the block from being a candidate for use by OLR.

In step 203 the OLR component receives a list of database records to be analyzed. This list may include a keyword (i.e., "ALL"), or may identify individual database records. If a keyword is used, the database records represented by the keyword are to be analyzed. For example, the "ALL" keyword indicates all of the database records (i.e., the entire database) are to be analyzed.

In step 204 the physical characteristics of each database record on the list are analyzed. Physical Locator (PL) trace records are built for each database record on the list. The PL trace records contain physical location information for each segment of each database record on the list. The PL trace records are used to calculate a total number of physical blocks currently used to bold each database record on the list and a minimum number of physical blocks needed to hold each database record on the list. These calculations are made in order to identify fragmented database records and the segments which contain fragmented boundary twin chains. A reorganization recommendation list is created for each database record on the list, including fragmented boundary twin chains.

A twin chain is a collection of segments of the same type that have the same parent. A boundary parent segment is a parent segment, other than a root segment, that exists in a data set group as the lowest level segment in the data set group (i.e., all children of the parent segment are in a different data set group). If two or more boundary parent segments exist under the same parent, the boundary parent segments may also be referred to as a boundary twin chain. A boundary child segment is a non-parent segment that exists as the lowest level segment in the database hierarchy. Boundary child segments may reside in any data set group. Boundary child or boundary parent segments may also be referred to as boundary twin chains when a second segment of a particular segment type is created. A fragmented boundary twin chain is a boundary twin chain that spans more blocks than actually required.

In step 205 each fragmented database record on the list is reorganized. In one embodiment, the OLR component may initiate a call to the SM component to obtain the number of blocks needed. The SM component may then assign the blocks and protect the blocks from use by other processes. The sub-set of the SM component which assigns the blocks may be referred to as a space analyzer.

It is noted that there may be one or more space analyzers within a shared IMS complex (i.e., one or more IMS databases). Multiple space analyzers communicate with each other using asynchronous techniques. This allows all of the space analyzers in the shared IMS complex to execute as one to accomplish the needs of OLR. For example, if the space analyzer on one IMS database assigns a block to be used by OLR, a message is sent to all the other space analyzer partners. These space analyzer partners cause the space manager routines on their respective IMS databases to prevent the standard IMS space management routines from using that particular block until it is released by OLR. Also, if one of the other IMS databases causes a block to change from free to used, or from used to free, a message is sent to the monitoring space analyzer to update the free block bit map. The process of assigning free blocks by a space analyzer may comprise the following steps: (1) the space analyzer may inspect its free block bit map and select the blocks that best fit the request; and (2) a message to protect these blocks may be sent to the space analyzers on all IMS databases on the shared IMS complex.

Following the assignment of blocks, the SM component returns a list of the assigned blocks to the OLR component. The OLR component may then retrieve the database record, delete the database record, and insert the database record into the list of blocks provided by the SM component. Lastly, the changes may be committed to the database.

In step 206 a looping process through steps 204 and 205 is repeated until each database record on the list is no longer fragmented.

FIG. 3: Examples of Fragmented Database Records in an IMS Database

FIG. 3 illustrates an exemplary portion of an IMS database including two fragmented database records. A database record begins with a root segment and may have one or more child segments associated with it. As shown, this portion of an IMS database includes four blocks labeled "Block 1", "Block 4", "Block 6", and "Block 7". Block 1 contains segments 1, 2, and 3; Block 4 contains segments 31 and 32; Block 6 contains segment 52; and Block 7 contains segment 63. Segments 1 and 3 are root segments, and all of the other segments are child segments. In general, as new child segments are added to an IMS database hierarchy, the segments may be added to blocks depending on space availability. As a result, related segments (i.e., segments belonging to the same database record) may be stored in different blocks, possibly non-contiguous blocks. This results in a fragmented database, as shown in FIG. 3. As a result, access of a database record may require reading a number of non-contiguous blocks, which results in lengthier access times. For example, retrieving the database record beginning with root segment 1 requires 3 blocks to be read, as follows; read block 1 to obtain segments 1 and 2; read block 6 to obtain segment 52; read block 4 to obtain segment 31. Similarly, retrieving the database record beginning with root segment 3 also requires 3 blocks to be read, as follows: read block 1 to obtain segment 3; read block 4 to obtain segment 32; read block 7 to obtain segment 63.

Figure 4:
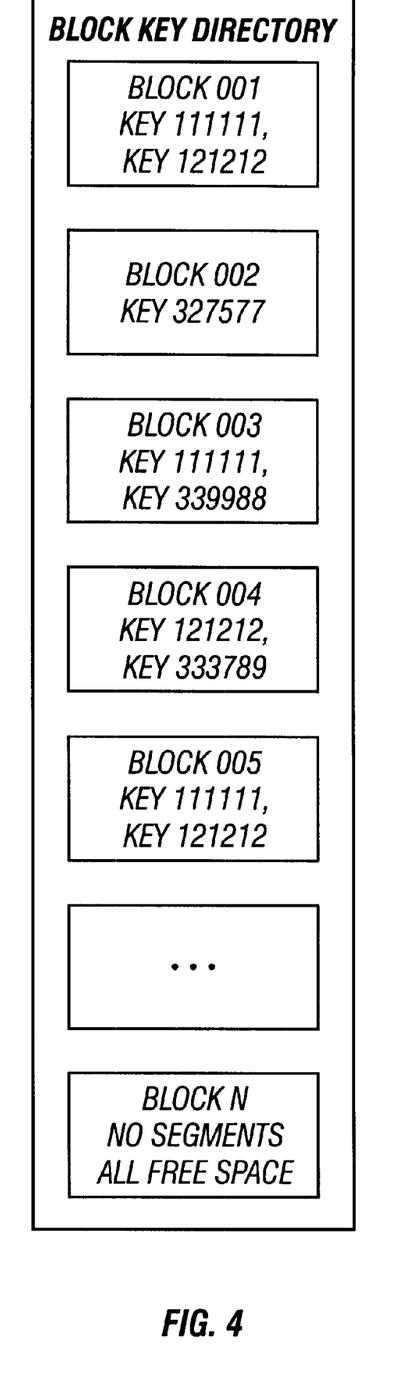
FIG. 4 illustrates a block key directory according to one embodiment.

FIG. 4: Block Key Director

FIG. 4 illustrates a block key directory. A block key directory as used herein is a logical file or memory area that contains segment key information for every block within a database data set group. The block key directory is also used to identify the database records associated with each segment (both root segments and non-root segments) contained within a block.

As shown, the block key directory includes six blocks labeled "Block 001". "Block 002", "Block 003", "Block 004", "Block 005", and "Block N". It is noted that there is a blank block between Blocks "005" and "N" indicating that an unspecified number of intermediate blocks may exist between Blocks "005" and "N". "Block 001", "Block 002", "Block 003", "Block 004", and "Block 005" each are shown containing one or more keys, as follows: Block 001 contains key 111111 and key 121212; Block 002 contains key 327577; Block 003 contains key 111111 and key 339988; Block 004 contains key 121212 and key 333789; and Block 005 contains key 111111 and key 121212. A key is an identifier for a database record. The database record associated with key 111111 has segments in Blocks 001, 003, and 005. However, only one of Blocks 001, 003, and 005 contains the root segment for the database record associated with key 111111. Similarly, the database record associated with key 121212 has segments in Blocks 001, 004, and 005. It is noted that Block 001 and Block 005 have the same keys because both blocks contain segments for the database record associated with key 111111 and the database record associated with key 121212. Block N, being the last block in the block key directory, contains no keys (i.e., no segments), and therefore is made up entirely of free space.

Figure 5:
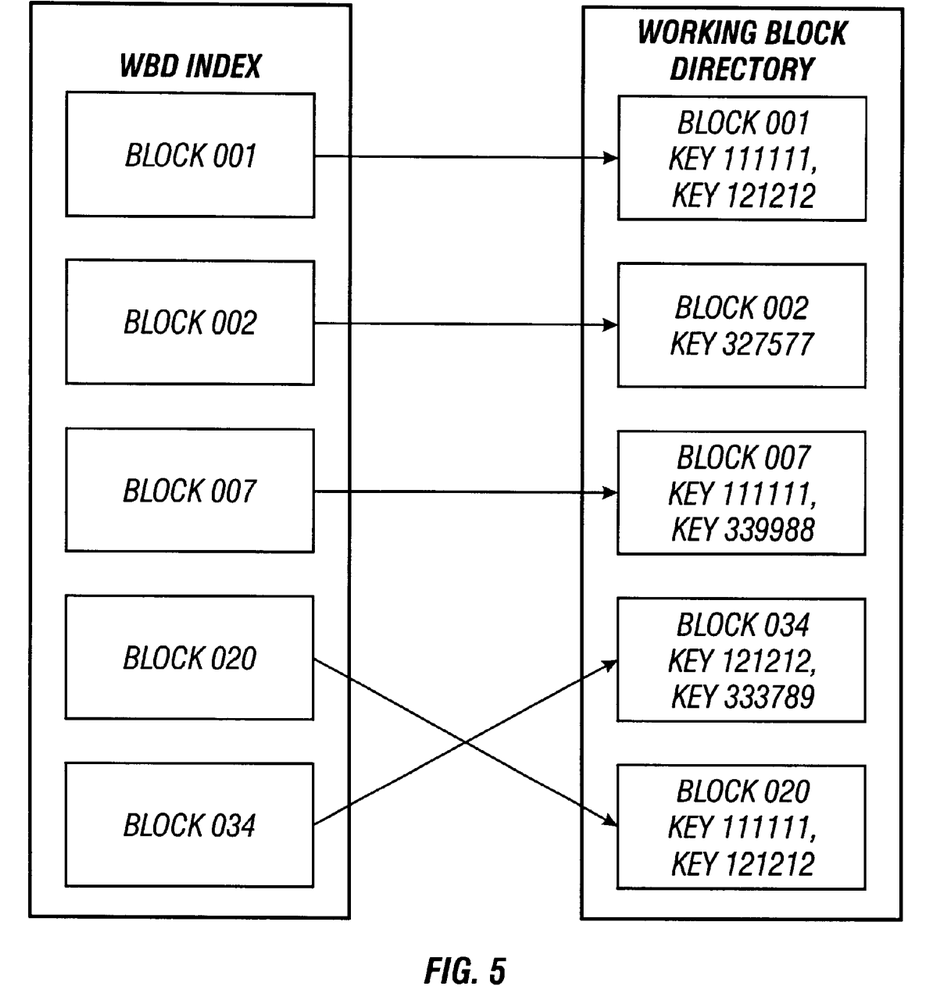
FIG. 5 illustrates the relationship between a working block directory index and a working block directory according to one embodiment.

FIG. 5: Working Block Directory Index and Working Block Directory

FIG. 5 illustrates the relationship between a working block directory index and a working block directory. A working block directory as used herein is a logical file or memory area that is maintained in the same format as the Block Key Directory (see FIG. 4) and is used to bold temporary changes to the Block Key Directory. These changes occur during block reorganization due to movement of database record segments within blocks.

As shown, the working block directory includes five blocks labeled "Block 001", "Block 002", "Block 007", "Block 034", and "Block 020". Block 001, Block 002, Block 007, Block 034, and Block 020 each are shown containing one or more keys, as follows: Block 001 contains key 111111 and key 121212; Block 002 contains key 327577; Block 007 contains key 111111 and key 339988; Block 034 contains key 121212 and key 333789; and Block 020 contains key 111111 and key 121212.

The key values associated with each block entry indicate which database records must be moved in order to empty a specific block. The working block directory contains entries relating to segment/key changes for each changed block.

The working block directory is a sparse file or memory area that is used to augment the block key directory. The working block directory only contains references to segments that have 'moved' since the block key directory was built. The working block directory's entries represent both added and removed entries for a key. As an example, if all of the segments for key 111111 are moved out of block 20, a 'moved' entry for block 20, key 111111 is added in the working block directory. Later, if block 20 is assigned to the target range, all segments will need to be moved out of block 20, the block key directory would contain an entry for key 111111 and that entry would be put in the list. Consulting the working block directory at that point would reveal the 'moved' entry for key 111111 exists in the working block directory. Subsequently, the list would be corrected by deleting key 111111 from the list of database records that need to be moved.

Figure 6A:
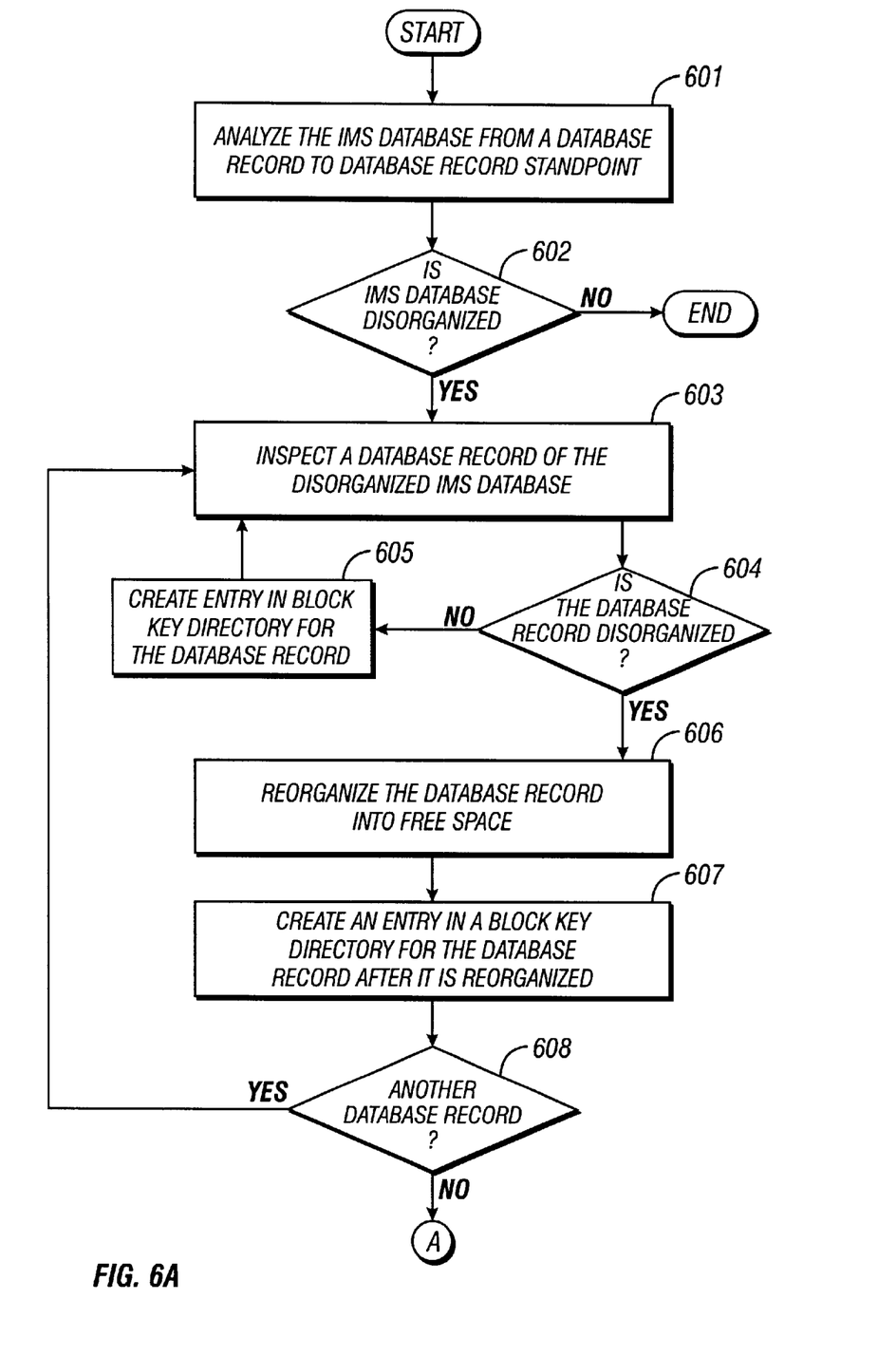
FIG. 6a is a first of a series of three flowcharts illustrating an overview of block mode reorganization of an IMS database according to one embodiment.
Figure 6B:
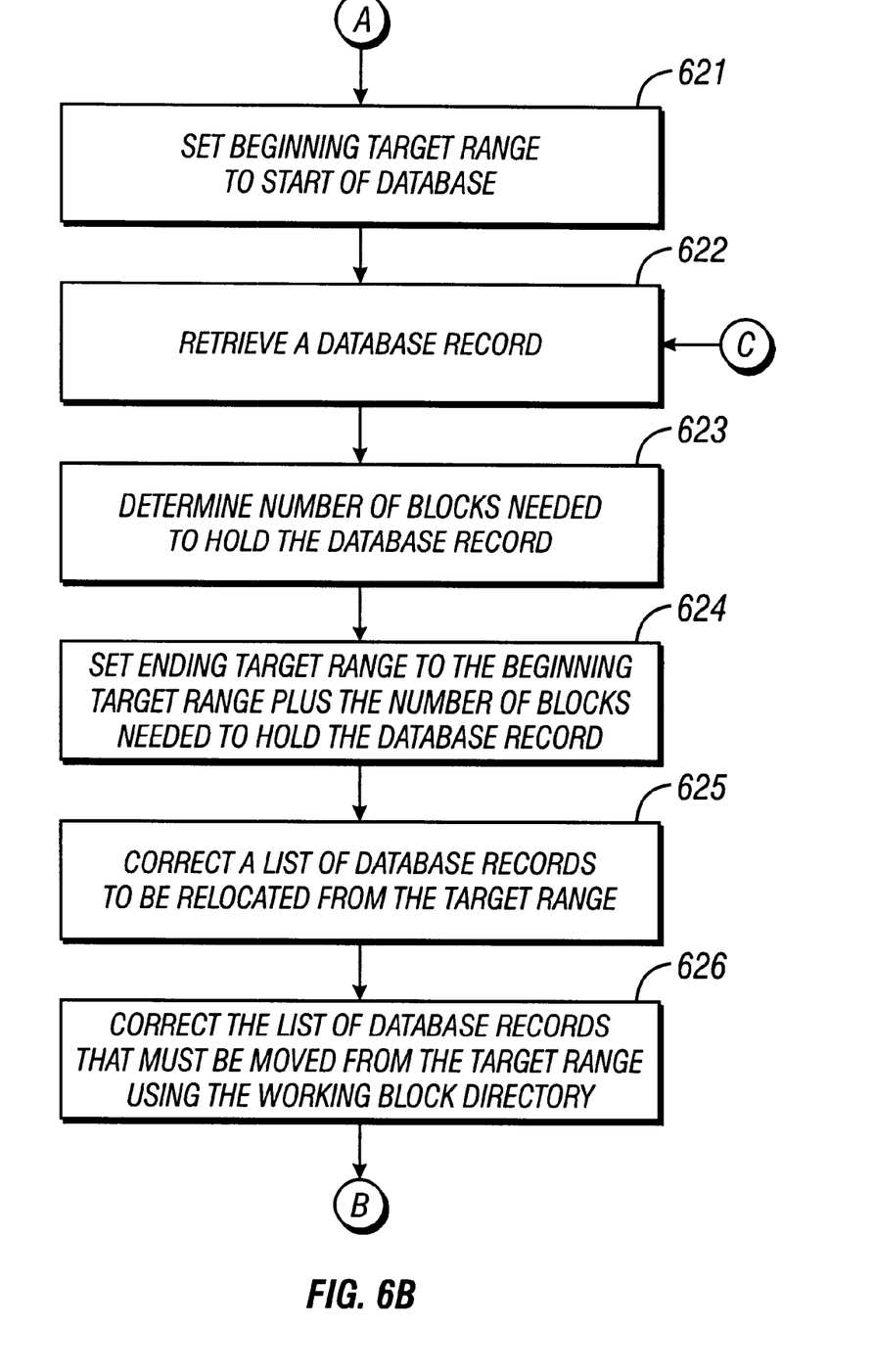
FIG. 6b is a second of the series of three flowcharts illustrating the overview of block mode reorganization of the IMS database according to one embodiment.
Figure 6C:
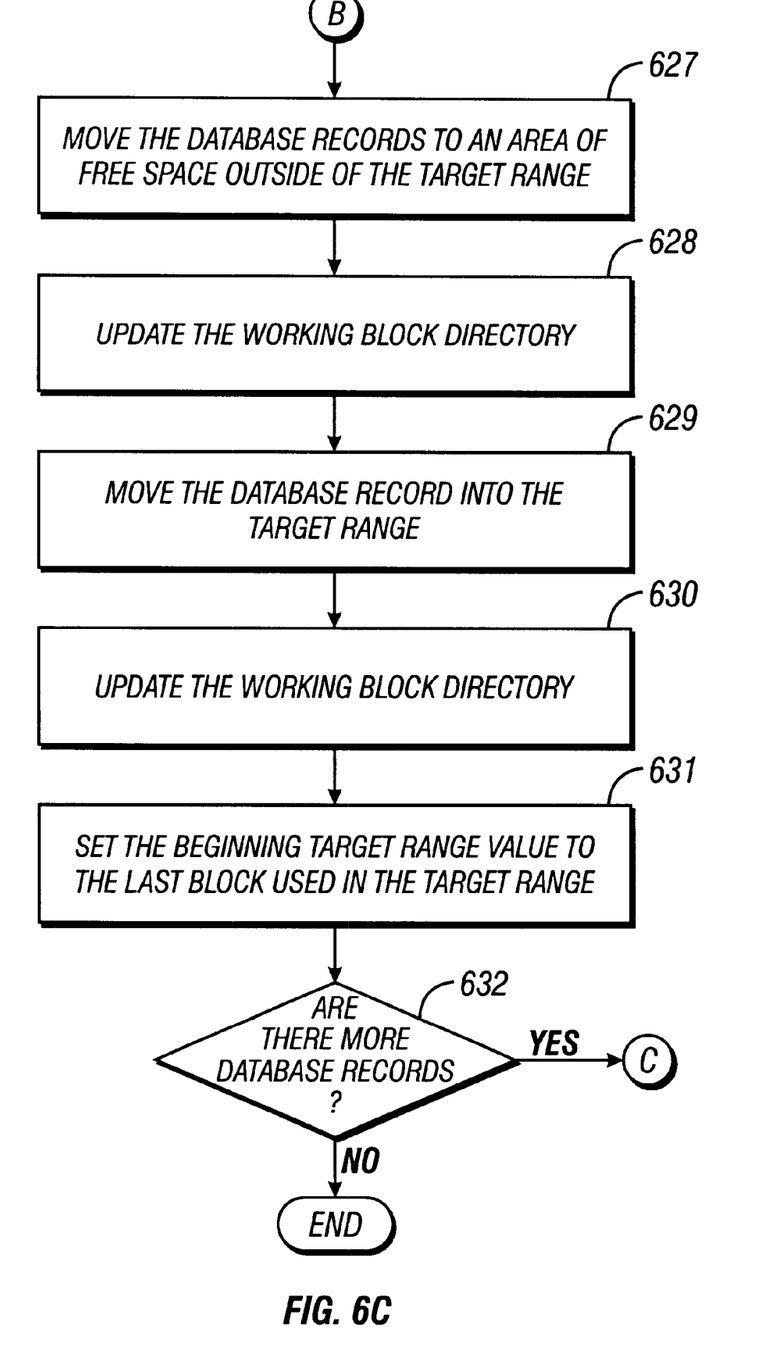
FIG. 6c is a third of the series of three flowcharts illustrating the overview of block mode reorganization of the IMS database according to one embodiment.

FIGS. 6a–6c: Block Mode Reorganization of an IMS Database

FIGS. 6a–6c are flowcharts of an embodiment of a system and method for block mode reorganization of an IMS database. The process of block mode reorganization is begun after completion of the steps outlined in FIG. 2 which reorganize individual database records. FIG. 6a illustrates phase 1 of block mode reorganization, FIGS. 6b and 6c illustrate phase 2 of block mode reorganization.

In step 601 the IMS database is analyzed subsequent to the reorganization of each fragmented database record on the list to determine if the IMS database is disorganized from a database record to database record standpoint.

In step 602 the results of the analysis of the IMS database are reviewed. If the IMS database is determined to be disorganized on a database record to database record basis, processing continues with step 603, otherwise, processing is complete.

In step 603 a database record of the disorganized IMS database is inspected to determine if the database record is disorganized. Step 604 is a decision step; if the database record is disorganized, processing continues with step 606; otherwise, step 605 is processed, followed by a loop back to step 603 where the next database record is inspected.

In step 605 an entry is created in a block key directory comprising the identity of the organized database record. This is necessary so that all database blocks (i.e, blocks from organized database records as well as blocks from disorganized database records) with all the database keys in each database block are represented in the block key directory at phase 1 completion.

In step 606 the disorganized database record is reorganized into free space of the IMS database. In step 607 an entry is created in a block key directory comprising the identity of the database record after it has been reorganized into free space of the IMS database. Step 608 is a decision step: if there are remaining database records in the disorganized IMS database that are yet to be inspected, then processing loops back to step 603; otherwise, processing continues with step 621, in FIG. 6b. These steps 603–608 operate to inspect each database record of the IMS database and either create a corresponding entry in a block key directory if the record is not disorganized or, if the record is disorganized, then the database record is reorganized, followed by a corresponding entry being created in the block key directory.

In step 621 a beginning target range value may be initialized to the beginning of the disorganized IMS database. At this point, the ending target range value may also be initialized to the beginning of the disorganized IMS database, in one embodiment. In step 622 a database record of the disorganized IMS database is retrieved. The retrieval is done in hierarchical order. In step 623 a number of blocks needed to hold the retrieved database record is determined.

In step 624 an ending target range value is set to the sum of the beginning target range value and the number of blocks needed to hold the retrieved database record.

In step 625 a list of database records is created using information from the block key directory. The database records on this list are to be relocated from the target range in order to free the necessary amount of space needed to hold the retrieved database record. In step 626 the list of database records may be corrected, if needed, by using information from a working block directory. In step 627 the database records may be moved to an area of free space outside of the target range within the disorganized IMS database.

In step 628 the working block directory may be updated to reflect the change to block content due to the database records being moved. In step 629 the database record may be moved into the target range. In step 630 the working block directory may be updated to reflect the changes to block content caused by moving the selected database record to the target zone.

In step 631 the beginning target range value is set to the last block used in the target range. At this point, the ending target range value may also be set to the last block used in the target range, in one embodiment. Step 632 is a decision step: if there are database records not yet processed, then processing loops back to step 622; otherwise, processing is complete.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method for reorganizing an IMS database, the method comprising:
    allowing concurrent updates and access to the IMS database;
    building a map of free blocks in the IMS database;
    receiving a list of database records to be analyzed;
    analyzing physical characteristics of each database record on the list wherein said analyzing uses the map of free blocks in the IMS database; and
    reorganizing each database record on the list based on the physical characteristics of each database record.

2. The method of claim 1 wherein building a map of free blocks in the IMS database further comprises:
    reading each block in the IMS database;
    analyzing each block in response to said reading to determine the amount of free space in each block in the IMS database;

designating as "free" in the map of free blocks those blocks for which the amount of free space for the block exceeds a pre-determined threshold; and designating as "used" in the map of free blocks those blocks for which the amount of free space for the block falls below a pre-determined threshold.

3. The method of claim 1 further comprising dynamically maintaining the map of free blocks in the IMS database after building the map of free blocks in the IMS database wherein the dynamic maintenance further comprises:

monitoring the amount of free space for each block in the IMS database;

controlling the status of a "free space bit" in the map of free blocks for each block in the IMS database based on the monitoring;

designating as "free" in the map of free blocks those blocks for which the amount of bee space for the block exceeds a pre-determined threshold; and designating as "used" in the map of free blocks those blocks for which the amount of free space for the block falls below a pre-determined threshold.

4. The method of claim 1 wherein analyzing physical characteristics of each database record on the list further comprises:

tracing database retrieval to collect physical location information for each segment of the database record;

identifying one or more segments which represent a fragmented boundary twin chain using the collected physical location information for each segment of the database record;

creating a list of fragmented boundary twin chains in response to identifying one or more segments which represent a fragmented boundary twin chain;

determining a total number of physical blocks currently used to hold the database record, wherein said determining uses the physical location information of the segments of the database record;

calculating a minimum number of physical blocks needed to hold the database record, wherein said calculating uses the physical location information of the segments of the database record; and determining if the database record is fragmented in response to the total number of physical blocks currently used and the minimum number of physical blocks needed to hold the database record.

5. The method of claim 1, further comprising:

analyzing the IMS database subsequent to the reorganization of each fragmented database record on the list wherein said analyzing determines if the IMS database is disorganized from a database record to database record standpoint; and reorganizing the disorganized IMS database record by record.

6. The method of claim 5, wherein reorganizing the disorganized IMS database record by record further comprises:

inspecting a database record of the disorganized IMS database;

determining if the database record is disorganized in response to said inspecting the database record;

moving the disorganized database records into free space within the disorganized IMS database; and creating an entry in a block key directory comprising the identity of each block used by each database record in the disorganized IMS database.

7. The method of claim 6, further comprising:

setting a beginning target range value to the beginning of the disorganized IMS database;

retrieving a database record of the disorganized IMS database in hierarchical order;

determining a number of blocks needed to hold the retrieved database record;

setting the ending target range value to the beginning target range value plus the number of blocks needed to hold the retrieved database record;

using information from the block key directory to create a list of database records to be relocated from the target range in order to free the necessary amount of space needed to hold the retrieved database record;

using information from a working block directory to correct as needed the list of database records that must be moved from the target range;

moving the database records included on the list of database records to be relocated to an area of free space outside of the target range within the disorganized IMS database;

updating the working block directory to reflect the change to block content in response to the database record being moved;

in moving the database record into the target range;

updating the working block directory to reflect the change to block content in response to the moving of the database record into the target range; and setting the beginning target range value to the last block used in the target range.

8. A method for reorganizing an IMS database, the method comprising:

allowing concurrent updates and access to the IMS database;

building a map of free blocks in the IMS database;

receiving a list of database records to be analyzed;

analyzing physical characteristics of each database record on the list wherein said analyzing uses the map of free blocks in the IMS database;

retrieving a database record on the list;

determining a minimum number of physical blocks needed to hold the database record;

assigning space for at least the minimum number of physical blocks needed to hold the database record;

deleting the database record;

inserting the database record into the assigned blocks; and committing the changes to the database.

9. The method of claim 8 wherein assigning space for at least the minimum number of physical blocks needed to hold the database record further comprises:

determining a list of free blocks available;

using the blocks from the list of free blocks in first-in-first-out order; and using a standard IMS block assignment if the list of free blocks is exhausted.

10. A system for reorganizing an IMS database, the system comprising:

a network;

a CPU coupled to the network;

a memory coupled to the CPU which stores an IMS database;

a system memory coupled to me CPU, wherein the system memory stores one or more computer programs executable by the CPU;

wherein the computer programs are executable to:
allowing concurrent updates and access to the IMS database;
building a map of free blocks in the IMS database;
receiving a list of database records to be analyzed;
analyzing physical characteristics of each database record on the list wherein said analyzing uses the map of free blocks in the IMS database; and
reorganizing each database record on the list based on the physical characteristics of each database record.

11. The system of claim 10 wherein in building a map of free blocks in the IMS database the computer programs are further executable to:
read each block in the IMS database;
analyze each block in response to said reading to determine the amount of free space in each block in the IMS database;
designate as "free" in the map of free blocks those blocks for which the amount of free space for the block exceeds a pre-determined threshold; and
designate as "used" in the map of free blocks those blocks for which the amount of free space for the block falls below a pre-determined threshold.

12. The system of claim 10, wherein the computer programs are further executable to dynamically maintain the map of free blocks in the IMS database after building the map of free blocks in the IMS database and wherein in dynamically maintaining the map of free blocks in the IMS database the computer programs are further executable to:
monitor the amount of free space for each block in the IMS database;
control the status of a "free space bit" in the map of free blocks for each block in the IMS database based on the monitoring;
designate as "free" in the map of free blocks those blocks for which the amount of free space for the block exceeds a pre-determined threshold; and
designate as "used" in the map of free blocks those blocks for which the amount of free space for the block falls below a pre-determined threshold.

13. The system of claim 10 wherein in analyzing physical characteristics of each database record on the list the computer programs are further executable to:
trace database retrieval to collect physical location information for each segment of the database record;
identify one or more segments which represent a fragmented boundary twin chain using the collected physical location information for each segment of the database record;
create a list of fragmented boundary twin chains in response to identifying one or more segments which represent a fragmented boundary twin chain;
determine a total number of physical blocks currently used to hold the database record, wherein said determining uses the physical location information of the segments of the database record;
calculate a minimum number of physical blocks needed to hold the database record, wherein said calculating uses the physical location information of the segments of the database record; and
determine if the database record is fragmented in response to the total number of physical blocks currently used and the minimum number of physical blocks needed to hold the database record.

14. The system of claim 10 wherein in reorganizing each fragmented database record on the list the computer programs are further executable to:
retrieve the database record;
determine a minimum number of physical blocks needed to hold the database record;
assign space for at least the minimum number of physical blocks needed to hold the database record;
delete the database record;
insert the database record into the assigned blocks; and
commit the changes to the database.

15. The system of claim 14 wherein in assigning space for at least the minimum number of physical blocks needed to hold the database record the computer programs are further executable to:
determine a list of free blocks available;
use the blocks from the list of free blocks in first-in-first-out order; and
use a standard IMS block assignment if the list of free blocks is exhausted.

16. The system of claim 10, wherein the computer programs are further executable to:
analyze the IMS database subsequent to the reorganization of each fragmented database record on the list wherein said analyzing determines if the IMS database is disorganized from a database record to database record standpoint; and
reorganize the disorganized IMS database record by record.

17. The system of claim 16, wherein in reorganizing the disorganized IMS database record by record the computer programs are further executable to:
inspect a database record of the disorganized IMS database;
determine if the database record is disorganized in response to said inspecting the database record;
move the disorganized database records into free space within the disorganized IMS database; and
create an entry in a block key directory comprising the identity of each block used by each database record in the disorganized IMS database.

18. The system of claim 17, wherein the computer programs are further executable to:
set a beginning target range value to the beginning of the disorganized IMS database;
retrieve a database record of the disorganized IMS database in hierarchical order;
determine a number of blocks needed to hold the retrieved database record;
set the ending target range value to the beginning target range value plus the number of blocks needed to hold the retrieved database record;
use information from the block key directory to create a list of database records to be relocated from the target range in order to free the necessary amount of space needed to hold the retrieved database record;
use information from a working block directory to correct as needed the list of database records that must be moved from the target range;
move the database records included on the list of database records to be relocated to an area of free space outside of the target range within the disorganized IMS database;
update the working block directory to reflect the change to block content in response to the database record being moved;

move the database record into the target range;

update the working block directory to reflect the change to block content in response to the moving of the database record into the target range; and set the beginning target range value to the last block used in the target range.

19. A carrier medium which stores program instructions for reorganizing an IMS database, wherein the program instructions are executable to implement:

allowing concurrent updates and access to the IMS database;

building a map of free blocks in the IMS database;

receiving a list of database records to be analyzed;

analyzing physical characteristics of each database record on the list wherein said analyzing uses the map of free blocks in the IMS database; and reorganizing each database record on the list based on the physical characteristics of each database record.

20. The carrier medium of claim 19 wherein in building a map of free blocks in the IMS database the program instructions are further executable to implement:

reading each block in the IMS database;

analyzing each block in response to said reading to determine the amount of free space in each block in the IMS database;

designating as "free" in the map of free blocks those blocks for which the amount of free space for the block exceeds a pre-determined threshold; and designating as "used" in the map of free blocks those blocks for which the amount of free space for the block falls below a pre-determined threshold.

21. The carrier medium of claim 19, wherein the program instructions are further executable to implement dynamically maintaining the map of free blocks in the IMS database after building the map of free blocks in the IMS database and wherein in dynamically maintaining the map of free blocks in the IMS database the program instructions are further executable to implement:

monitoring the amount of free space for each block in the IMS database;

controlling the status of a "free space bit" in the map of free blocks for each block in the IMS database based on the monitoring;

designating as "free" in the map of free blocks those blocks for which the amount of free space for the block exceeds a pre-determined threshold; and designating as "used" in the map of free blocks those blocks for which the amount of free space for the block falls below a pre-determined threshold.

22. The carrier medium of claim 19 wherein in analyzing physical characteristics of each database record on the list the program instructions are further executable to implement:

tracing database retrieval to collect physical location information for each segment of the database record;

identifying one or more segments which represent a fragmented boundary twin chain using the collected physical location information for each segment of the database record;

creating a list of fragmented boundary twin chains in response to identifying one or more segments which represent a fragmented boundary twin chain;

determining a total number of physical blocks currently used to hold the database record, wherein said determining uses the physical location information of the segments of the database record;

calculating a minimum number of physical blocks needed to hold the database record, wherein said calculating uses the physical location information of the segments of the database record; and determining if the database record is fragmented in response to the total number of physical blocks currently used and the minimum number of physical blocks needed to hold the database record.

23. The carrier medium of claim 19 wherein in reorganizing each fragmented database record on the list the program instructions are further executable to implement:

retrieving the database record;

determining a minimum number of physical blocks needed to hold the database record;

assigning space for at least the minimum number of physical blocks needed to hold the database record;

deleting the database record;

inserting the database record into the assigned blocks; and committing the changes to the database.

24. The carrier medium of claim 23 wherein in assigning space for at least the minimum number of physical blocks needed to hold the database record the program instructions are further executable to implement:

determining a list of free blocks available;

using the blocks from the list of free blocks in first-in-first-out order; and using a standard IMS block assignment if the list of free blocks is exhausted.

25. The carrier medium of claim 19, wherein the program instructions are further executable to implement:

analyzing the IMS database subsequent to the reorganization of each fragmented database record on the list wherein said analyzing determines if the IMS database is disorganized from a database record to database record standpoint; and reorganizing the disorganized IMS database record by record.

26. The carrier medium of claim 25, wherein in reorganizing the disorganized IMS database record by record the program instructions are further executable to implement:

inspecting a database record of the disorganized IMS database;

determining if the database record is disorganized in response to said inspecting the database record;

moving the disorganized database records into free space within the disorganized IMS database; and creating an entry in a block key directory comprising the identity of each block used by each database record in the disorganized IMS database.

27. The carrier medium of claim 26, wherein the program instructions are further executable to implement:

setting a beginning target range value to the beginning of the disorganized IMS database;

retrieving a database record of the disorganized IMS database in hierarchical order;

determining a number of blocks needed to hold the retrieved database record;

setting the ending target range value to the beginning target range value plus the number of blocks needed to hold the retrieved database record;

using information from the block key directory to create a list of database records to be relocated from the target range in order to free the necessary amount of space needed to hold the retrieved database record;

using information from a working block directory to correct as needed the list of database records that must be moved from the target range;

moving the database records included on the list of database records to be relocated to an area of free space outside of the target range within the disorganized IMS database;

updating the working block directory to reflect the change to block content in response to the database record being moved;

moving the database record into the target range;

updating the working block directory to reflect the change to block content in response to the moving of the database record into the target range; and setting the beginning target range value to the last block used in the target range.

28. The carrier medium of claim 19, wherein the carrier medium is a memory medium.

29. A method for reorganizing an IMS database, the method comprising:

building a map of free blocks in the IMS database;

analyzing physical characteristics of a database record wherein said analyzing uses the map of free blocks;

reorganizing the database record based on the physical characteristics of the database record; and allowing access to another database record during the step of reorganizing the database record.

30. The method in claim 29, wherein building a map of free blocks in the IMS database further comprises:

reading each block in the IMS database;

analyzing each block in response to said reading to determine the amount of free space in each block in the IMS database;

designating as "free" in the map of free blocks those blocks for which the amount of free space for the block exceeds a pre-determined threshold; and designating as "used" in the map of free blocks those blocks for which the amount of free space for the block falls below a pre-determined threshold.

31. The method of claim 29 wherein reorganizing the database record further comprises:

retrieving the database record;

determining a minimum number of physical blocks needed to hold the database record;

assigning space for at least the minimum number of physical blocks needed to hold the database record;

deleting the database record;

inserting the database record into the assigned blocks; and committing the changes to the database.

32. A computer-readable medium having a computer-executable program therein for performing a method, wherein the method comprising:

building a map of free blocks in the IMS database;

analyzing physical characteristics of a database record wherein said analyzing uses the map of free blocks in the IMS database;

reorganizing the database record based on the physical characteristics of the database record; and allowing access to another database record during the step of reorganizing the database record.

33. The computer-readable medium having a computer-executable program therein for performing a method, as in claim 32, wherein building a map of free blocks in the IMS database further comprises:

reading each block in the IMS database;

analyzing each block in response to said reading to determine the amount of free space in each block in the IMS database;

designating as "free" in the map of free blocks those blocks for which the amount of free space for the block exceeds a pre-determined threshold; and designating as "used" in the map of free blocks those blocks for which the amount of free space for the block falls below a pre-determined threshold.

34. The computer-readable medium having a computer-executable program therein for performing a method, as in claim 33, wherein reorganizing the database record further comprises:

retrieving the database record;

determining a minimum number of physical blocks needed to hold the database record;

assigning space for at least the minimum number of physical blocks needed to hold the database record;

deleting the database record;

inserting the database record into the assigned blocks; and committing the changes to the database.

35. A method for reorganizing an IMS database, the method comprising:

building a map of free blocks in the IMS database;

analyzing physical characteristics of a database record wherein said analyzing uses the map of free blocks; and reorganizing the database record based on the physical characteristics of the database record.

36. A computer-readable medium having a computer-executable program therein for performing the method as in claim 35.

* * * * *